(12) United States Patent
Kalchbrenner et al.

(10) Patent No.: US 10,354,015 B2
(45) Date of Patent: Jul. 16, 2019

(54) PROCESSING TEXT SEQUENCES USING NEURAL NETWORKS

(71) Applicant: DeepMind Technologies Limited, London (GB)

(72) Inventors: Nal Emmerich Kalchbrenner, London (GB); Karen Simonyan, London (GB); Lasse Espeholt, London (GB)

(73) Assignee: DeepMind Technologies Limited, Mountain View, CA (US)

( * ) Notice: Subject to any disclaimer, the term of this patent is extended or adjusted under 35 U.S.C. 154(b) by 0 days.

(21) Appl. No.: 16/032,971

(22) Filed: Jul. 11, 2018

(65) Prior Publication Data

US 2018/0329897 A1 Nov. 15, 2018

Related U.S. Application Data

(63) Continuation of application No. PCT/US2017/058046, filed on Oct. 24, 2017.
(Continued)

(51) Int. Cl.
*G06F 17/28* (2006.01)
*G06N 3/04* (2006.01)
(Continued)

(52) U.S. Cl.
CPC ........ *G06F 17/289* (2013.01); *G06F 17/2818* (2013.01); *G06N 3/0454* (2013.01);
(Continued)

(58) Field of Classification Search
CPC .................................................. G06F 17/289
(Continued)

(56) References Cited

U.S. PATENT DOCUMENTS

| 7,409,340 B2 | 8/2008 | Holzapfel |
| 8,527,276 B1 | 9/2013 | Senior |

(Continued)

FOREIGN PATENT DOCUMENTS

CA 2810457 9/2014

OTHER PUBLICATIONS

'homepages.inf.ed.ac.uk' [online] "CSTR VCTK Corpus English Multi-Speaker Corpus for CSTR Voice Cloning Toolkit," Junichi Yamagishi, The Centre for Speech Technology Research, Available on or before Mar. 13, 2013, [retrieved on Dec. 26, 2017] Retrieved from Internet URL<http://homepages.inf.ed.ac.uk/jyamagis/page3/page58/page58.html> via the Wayback Machine at URL<https://web.archive.org/web/20130315110746/http://homepages.inf.ed.ac.uk/jyamagis/page3/page58/page58.html> 2 pages.
(Continued)

*Primary Examiner* — Susan I McFadden
(74) *Attorney, Agent, or Firm* — Fish & Richardson P.C.

(57) ABSTRACT

Methods, systems, and apparatus, including computer programs encoded on a computer storage medium, for neural machine translation. In one aspect, a system is configured to receive an input sequence of source embeddings representing a source sequence of words in a source natural language and to generate an output sequence of target embeddings representing a target sequence of words that is a translation of the source sequence into a target natural language, the system comprising: a dilated convolutional neural network configured to process the input sequence of source embeddings to generate an encoded representation of the source sequence, and a masked dilated convolutional neural network configured to process the encoded representation of the source sequence to generate the output sequence of target embeddings.

20 Claims, 4 Drawing Sheets

Related U.S. Application Data

(60) Provisional application No. 62/413,366, filed on Oct. 26, 2016.

(51) Int. Cl.
  *G06N 3/08* (2006.01)
  *G10L 15/197* (2013.01)

(52) U.S. Cl.
  CPC .......... *G06N 3/0472* (2013.01); *G06N 3/084* (2013.01); *G10L 15/197* (2013.01)

(58) Field of Classification Search
  USPC .......................................................... 704/2
  See application file for complete search history.

(56) References Cited

U.S. PATENT DOCUMENTS

| | | | |
|---|---|---|---|
| 9,058,811 | B2 | 6/2015 | Wang |
| 9,190,053 | B2* | 11/2015 | Penn ........................ G10L 15/16 |
| 9,734,824 | B2* | 8/2017 | Penn ........................ G10L 15/16 |
| 9,953,634 | B1* | 4/2018 | Pearce ................... G10L 15/063 |
| 10,049,106 | B2* | 8/2018 | Goyal ................. G06F 17/2881 |
| 2002/0110248 | A1 | 8/2002 | Kovales |
| 2012/0166198 | A1 | 6/2012 | Lin |
| 2016/0140951 | A1 | 5/2016 | Agionnyrgiannakis |
| 2016/0232440 | A1 | 8/2016 | Gregor |
| 2017/0262737 | A1 | 9/2017 | Rabinovich |
| 2018/0075343 | A1 | 3/2018 | Van den Oord et al. |
| 2018/0322891 | A1 | 11/2018 | Gerard |

OTHER PUBLICATIONS

'www.sp.nitech.ac.jp' [online] "Speech Synthesis as a Statistical Machine Learning Problem," Presentation. Keiichi Tokuda, Nogoya Institute of Technology, ASRU Hawaii, Dec. 14, 2011, 66 slides.
Agiomyrgiannakis "Vocain the vocoder and applications is speech synthesis," IEEE International Conference on Acoustics, Speech and Signal Processing, Apr. 19, 2015, 5 pages.
Bahdanau et al. "Neural machine translation by jointly learning to align and translation," arXiv 1409.0473v7, May 19, 2016, 15 pages.
Bishop. "Mixture density networks," Technical Report NCRG/94/004, Neural Computing Research Group, Aston University, 1994, 26 pages.
Chen et al. "Semantic image segmentation with deep convolutional nets and fully connected CRF's," arXiv 1412.7062v4, Jun. 7, 2016, 14 pages.
Fan et al. "TTS synthesis with bidirectional LSTM based recurrent neural networks," Fifteenth Annual Conference of the International Speech Communication Association, 2014, 5 pages.
Gonzalvo et al. "Recent advances in Google real-time HMM-driven unit selection synthesizer," In Proc. Interspeech, Sep. 2016, 5 pages.
He et al. "Deep residual learning for image recognition," arXiv 1512.03385v1, Dec. 10, 2015, 12 pages.
Hochreiter et al. "Long short-term memory," Neural Computation 9(8), Nov. 1997, 46 pages.
Hoshen et al. "Speech acoustic modeling from raw multichannel waveforms," IEEE International Conference on Acoustics, Speech and Signal Processing, Apr. 19, 2015, 5 pages.
Hunt et al. "Unit selection in a concatenative speech synthesis system using a large speech database," IEEE International Conference on Acoustics, Speech and Signal Processing, May 7, 1996, 4 pages.
International Search Report and Written Opinion issued in International Application No. PCT/US2017/050335, dated Jan. 2, 2018, 16 pages.
International Search Report and Written Opinion issued in International Application No. PCT/US2017/050320, dated Jan. 2, 2018, 16 pages.
International Search Report and Written Opinion issued in International Application No. PCT/US2017/058046, dated Jan. 31, 2018, 15 pages.
Jozefowicz et al. "Exploring the limits of language modeling," arXiv 1602.02410v2 Feb. 11, 2016, 11 pages.
Kalchbrenner et al. "Video pixel networks," arXiv 1610.00527v1, Oct. 3, 2016, 16 pages.
Karaali "text-to-speech conversion with neural networks: A recurrent TDNN approach," cs.NE/9811032, Nov. 24, 1998, 4 pages.
Kawahara et al. "Aperiodicity extraction and control using mixed mode excitation and group delay manipulation for a high quality speech analysis, modification and synthesis system straight," Second International Workshop on Models and Analysis of Vocal Emissions for Biomedical Applications, Sep. 2001, 6 pages.
Kawahara et al. "Restructuring speech representations using a pitch-adaptive time-frequency smoothing and an instantaneous-frequency-based f0 extraction: possible role of a repetitive structure in sounds," Speech Comm. 27(3), Sep. 1999, 17 pages.
Lamb et al. "Convolutional encoders for neural machine translation," Project reports of 2015 CS224d course at Stanford university, Jun. 22, 2015, 8 pages.
Law et al. "Input-agreement: a new mechanism for collecting data using human computation games," Proceedings of the SIGCHI Conference on Human Factors in Computing Systems, ACM, Apr. 4, 2009, 10 pages.
Lee et al. "Fully character-level neural machine translation without explicit segmentation," arXiv 1610.03017v1, Oct. 10, 2016, 14 pages.
Maia et al. "Statistical parametric speech synthesis with joint estimation of acoustic and excitation model parameters," ISCA SSW7, Sep. 24, 2010, 6 pages.
Meng et al. "Encoding source Language with convolutional neural network for machine translation," Proceedings of the 53rd annual meeting of the Association for Computational Linguistics and the 7th International Joint Conference on Natural Language Processing, vol. 1, Jul. 26, 2015, 11 pages.
Morise et al. "WORLD: A vocoder-based high-quality speech synthesis system for real-time applications," IEICE Tranc. Inf. Syst., E99-D(7), Jul. 1, 2016, 8 pages.
Moulines et al. "Pitch synchronous waveform processing techniques for text-to-speech synthesis using diphones," Speech Comm. (9), Dec. 1990, 15 pages.
Muthukumar et al. "A deep learning approach to data-driven parameterizations for statistical parametric speech synthesis," arXiv 1409.8558v1, Sep. 30, 2014, 5 pages.
Nair et al. "Rectified linear units improve restricted Boltzmann machines," Proceedings of the 37th International Conference on Machine Learning, Jun. 21-24, 2010, 8 pages.
Nakamura et al. "Integration of spectral feature extraction and modeling for HMM-based speech synthesis," IEICE Transaction on Information and Systems 97(6), Jun. 2014, 11 pages.
Palaz et al. "Estimating phoneme class conditional probabilities from raw speech signal using convolutional neural networks," arXiv 1304.1018v2, Jun. 12, 2013, 5 pages.
Peltonen et al. "Nonlinear filter design: methodologies and challenges," ISPA Proceedings of the 2nd International Symposium on Image Signal Processing and Analysis, Jun. 2001, 6 pages.
Sagisaka et al. "ATR v-talk speech synthesis system," Second International Conference on Spoken Language Processing, Oct. 1992, 4 pages.
Sainath et al. "Learning the speech front-end with raw waveform CLDNNs," Sixteenth Annual Conference of the International Speech Communication Association, Sep. 2015, 5 pages.
Takaki et al. "A deep auto-encoder based low dimensional feature extraction from FFT spectral envelopes for statistical parametric speech synthesis," IEEE International Conference on Acoustics Speech and Signal Processing, Mar. 20, 2016, 6 pages.
Theis et al. "Generative image modeling using spatial LSTMs," Advances in Neural Information Processing Systems, Dec. 2015, 9 pages.
Toda et al. "A speech parameter generation algorithm generation algorithm considering global variance for HMM-based speech synthesis," IEICE Trans. Inf. Syst. 90(5), May 1, 2007, 9 pages.

(56) References Cited

OTHER PUBLICATIONS

Toda et al. "Statistical approach to vocal tract transfer function estimation based on factor analyzed trajectory hmm." IEEE International Conference on Acoustics, Speech and Signal Processing, Mar. 31, 2008, 4 pages.

Tokuda et al. "Directly modeling speech waveforms by neural networks for statistical parametric speech synthesis," IEEE International Conference on Acoustics, Speech and Signal Processing, Apr. 19, 2015, 5 pages.

Tokuda et al. "Directly modeling voiced and unvoiced components in speech waveforms by neural networks," IEEE International Conference on Acoustics, Speech and Signal Processing, Mar. 20, 2016, 5 pages.

Tuerk et al. "Speech synthesis using artificial neural networks trained on cepstral coefficients," in Proc. Eurospeech, Sep. 1993, 4 pages.

Tuske et al. "Acoustic modeling with deep neural networks using raw time signal for LVCSR," Fifteenth Annual Conference of the International Speech Communication Association, Sep. 2014, 5 pages.

Uria et al. "Modeling acoustic feature dependencies with artificial neural networks: Trajectory-RNADE," Proceedings of the International Conference on Acoustics Speech and Signal Processing, Apr. 19, 2015, 5 pages.

Van den Oord et al. "Conditional image generation with pixelcnn decoders," arXiv 1606.05328v2, Jun. 18, 2016, 13 pages.

Van den Oord et al. "Pixel recurrent neural networks," arXiv 1601.06759v3, Aug. 19, 2016, 11 pages.

Van den Oord et al. "WaveNet: A Generative Model for Raw Audio," arXiv 1609.03499v2, Sep. 19, 2016, 15 pages.

Wu et al. "Minimum generation error training with direct log spectral distortion on LSPs for HMM-based speech synthesis," Interspeech, Sep. 2008, 4 pages.

Yoshimura. "Simultaneous modeling of phonetic and prosodic parameters and characteristic conversion for HMM-based text-to-speech systems," PhD thesis, Nagoya Institute of Technology, Jan. 2002, 109 pages.

Yu et al. "Multi-scale context aggregation by dilated convolutions," arXiv 1511.07122, Nov. Apr. 30, 2016, 13 pages.

Zen et al. "Fast, Compact, and high quality LSTM-RNN based statistical parametric speech synthesizers for mobile devices," arXiv 1606.06061v2, Jun. 22, 2016, 14 pages.

Zen et al. "Statistical parametric speech synthesis using deep neural networks," IEEE International Conference on Acoustics, Speech and Signal Processing, May 26, 2013, 5 pages.

Zen et al. "Statistical parametric speech synthesis," Speech Comm. 51(11) Nov. 30, 2009, 24 pages.

Zen, Heiga. An example of context-dependent label format for HMM-based speech synthesis in English, The HTS CMUARCTIC demo 133, Mar. 2, 2006, 1 page.

'www.itu.int' [online] "ITU-T Recommendation G 711, Pulse Code Modulation (PCM) of voice frequencies," Nov. 1988, [retrieved on Jul. 9, 2018] Retrieved from Internet: URL<https://www.itu.int/rec/T-REC-G.711-198811-I/en> 1 page.

Fant et al. "TTS synthesis with bidirectional LSTM based recurrent neural networks," Interspeech, Sep. 2014, 5 pages.

Tokuda. "Speech synthesis as a statistical machine learning problem," Invited talk given at ASRU, Dec. 2011, [retrieved on Jul. 9, 2018] Retrieved from Internet: URL<www.sp.nitech.ac.jp/~tokuda/tokuda_asru2011_for_pdf.pdf> 66 pages.

Written Opinion issued in International Application No. PCT/US2017/050320, dated Aug. 3, 2018, 7 pages.

Written Opinion issued in International Application No. PCT/US2017/050335, dated Aug. 3, 2018, 7 pages.

International Preliminary Report on Patentability issued in International Application No. PCT/US2017/050320, dated Dec. 14, 2018, 7 pages.

International Preliminary Report on Patentability issued in International Application No. PCT/US2017/050335, dated Dec. 14, 2018, 7 pages.

\* cited by examiner

PROCESSING TEXT SEQUENCES USING NEURAL NETWORKS

BACKGROUND

This specification relates to processing text sequences using neural networks.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that performs sequence transduction tasks, e.g., translates text from a source language to a target language, performs text summarization, or performs speech recognition.

According to a first aspect there is provided a neural machine translation system for processing text sequences. The system is configured to receive an input sequence of source embeddings representing a source sequence, for example a sequence of words in a source natural language, and to generate an output sequence of target embeddings representing a target sequence, for example a sequence of words that is a translation of the source sequence into a target natural language, the system comprising: a dilated convolutional neural network configured to process the input sequence of source embeddings to generate an encoded representation of the source sequence; and a masked dilated convolutional neural network configured to process the encoded representation of the source sequence to generate the output sequence of target embeddings.

In some implementations, the masked dilated convolutional neural network of the system is configured to generate the output sequence using dynamic unfolding. For example the decoder iteratively generates target embeddings based on previously generated target embeddings and the encoded source representation.

In some implementations, the encoded representation is a matrix that includes a respective column of data for each source embedding, and wherein, at each time step in the output sequence, the masked dilated convolutional network is configured to take as input the corresponding column of the encoded representation and to generate a target embedding.

In some implementations, for each time step that does not have a corresponding column in the encoded representation, the system is configured to add a new column to the encoded representation that corresponds to the time step and set values in the column to zero.

In some implementations, at each time step, the masked dilated convolutional neural network is conditioned on the encoded representation and the target embeddings at time steps before the time step.

In some implementations, the dilated convolutional neural network is configured to preserve a resolution of representations of the source embeddings throughout the dilated convolutional neural network.

In some implementations, the masked dilated convolutional neural network comprises a plurality of one-dimensional masked dilated convolutional neural network layers.

In some implementations, a particular one-dimensional masked dilated convolutional neural network layer is followed by a sub-batch normalization layer, wherein the sub-batch normalization layer is configured to, during training of the neural machine translation system on a batch of training sequences: determine batch normalization statistics of outputs generated by the particular one-dimensional masked dilated convolutional neural network layer for training sequences in an auxiliary sub-batch of the batch of training sequences; and normalize, using the batch normalization statistics, outputs generated by the particular one-dimensional masked dilated convolutional neural network layer for training sequences in a main sub-batch of the batch of training sequences that is different from the auxiliary sub-batch.

In some implementations, one or more of the one-dimensional masked dilated convolutional neural network layers are wrapped in a residual block that contains one or more additional convolutional layers.

In some implementations, the residual block includes a rectified linear unit (ReLU) activation layer.

In some implementations, the residual block includes a multiplicative unit activation layer.

In some implementations, the plurality of one-dimensional masked dilated convolutional neural network layers are grouped into a plurality of groups, and wherein, within each group, the dilation rates of one-dimensional masked dilated convolutional neural network layers in the group are doubled every layer.

In some implementations, each source embedding is a respective bag of n-grams embedding, and wherein, for a given character in the source sequence, the bag of n-grams embedding for the character is a combination of n-gram embeddings of adjacent tokens to the given character in the source sequence.

In some implementations, the bag of n-grams embedding of the given character is a sum of the n-gram embeddings of adjacent n-grams to the given character for n ranging from one to k, wherein k is a predetermined positive integer that is greater than or equal to two.

In some implementations, the system further comprises an input subsystem configured to: receive the source sequence; and generate a sequence of bag of n-grams embeddings from the source sequence.

In some implementations, the dilated convolutional neural network comprises a plurality of one-dimensional dilated convolutional neural network layers that are not masked.

According to a second aspect, there is provided one or more computer storage media encoded with instructions that, when executed by one or more computers, cause the one or more computers to implement the system.

According to a third aspect, there is provided a method comprising: obtaining an input sequence of source embeddings representing a source sequence, for example a sequence of words in a source natural language; and processing the input sequence using the system to generate an output sequence of target embeddings representing a target sequence, for example a sequence of words that is a translation of the source sequence into a target natural language.

Particular embodiments of the subject matter described in this specification can be implemented so as to realize one or more of the following advantages. A neural machine translation system as described in this specification can generate a translation such that the computation time of the system is minimized, i.e., such that the computation time is linear in the lengths of the source and target strings. The neural machine translation system processes inputs such that the resolution of the representation computed by the system stays the maximum possible throughout the computation, improving translation quality. By employing convolutional encoder and decoders, the neural machine translation system can generate translations that have a quality that matches or exceeds the state of the art, while having learning and inference times that are less than those of state of the art systems. For example, as compared to recurrent neural network, e.g., long short-term memory (LSTM), based architectures, the convolutional encoder and decoder do not need to be rolled out for each time step, decreasing the computational footprint required for training and inference. By using bag of n-gram embeddings, the neural machine translation system retains an open vocabulary and is able to predict rare words, proper names, numerical digits, and so on. Moreover, the paths traversed by forwards and backward signals in the neural machine translation system between inputs and outputs are independent of the sequence distance between the inputs and outputs, which allows better signal propagation and long-range dependency learning, thereby improving translation quality.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that performs language modelling tasks or translates text from a source language to a target language using neural networks.

In particular, for translation, the system is configured to receive an input sequence of source embeddings representing a source sequence of words in a source natural language and to generate an output sequence of target embeddings representing a target sequence of words that is a translation of the source sequence into a target natural language. More generally, the system can be applied to other sequence transduction applications where a source sequence is a mapped to a target sequence.

The system includes a convolutional neural network encoder configured to process the input sequence of source embeddings to generate an encoded representation of the source sequence.

The system also includes a masked convolutional neural network decoder configured to process the encoded representation of the source sequence to generate the output sequence of target embeddings.

Figure 1:
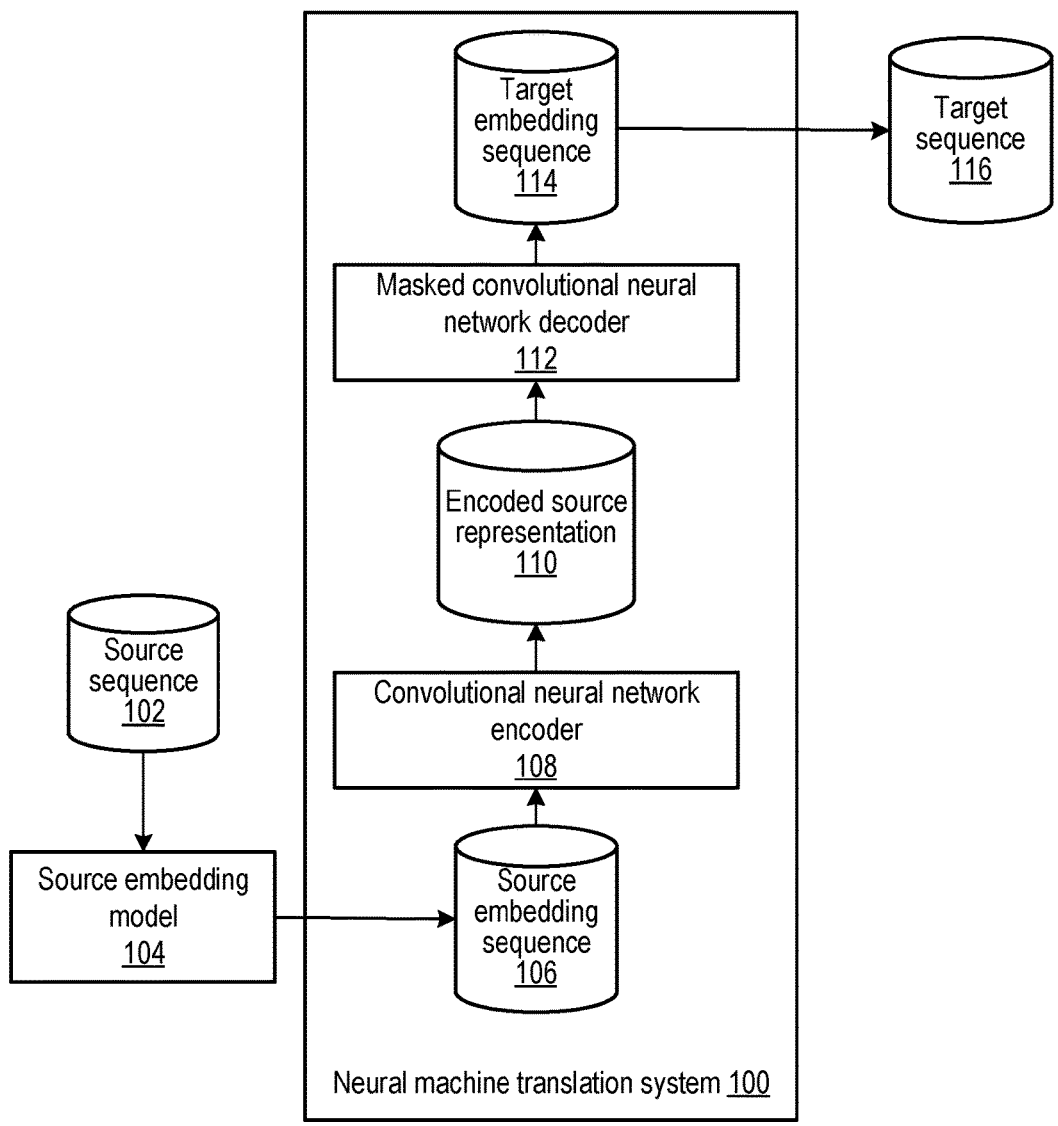
FIG. 1 shows an example neural machine translation system.

FIG. 1 shows an example neural machine translation system 100. The neural machine translation system 100 is an example of a system implemented as computer programs on one or more computers in one or more locations in which the systems, components, and techniques described below are implemented.

The neural machine translation system 100 receives as input a source embedding sequence 106 that is generated by a source embedding model 104 from a source sequence 102 in a source natural language. The sequence is a sequence of words in the source language, with each word made up by one or more characters. (The use of "word" does not exclude the possibility that the input sequence may contain numerals.) In some implementations, the source embedding model 104 can be a bag of n-grams embedding model. (That is, the source embedding model constitutes an input subsystem configured to receive the source sequence 102; and generate a source embedding sequence 106, for example a sequence of bag of n-grams embeddings, from the source sequence.)

The neural machine translation system 100 includes a convolutional neural network encoder 108 that takes as input the source embedding sequence 106 and generates as output an encoded source representation 110.

The encoder 108 has a dilated convolutional architecture and applies one-dimensional convolutions to the source embedding sequence 106. In general, dilated convolutional architectures have the effect of increasing the receptive field size of neurons in a convolutional network, allowing longer range interactions between neurons than would be feasible without dilation. A dilated one-dimensional convolutional layer generates an output by convolving the input with the kernel corresponding to the layer, where the convolution skips inputs according to a step size referred to as the dilation rate. Different dilated convolutional layers within a dilated convolutional network may have different dilation rates. If the dilation rate increases exponentially between layers, then the receptive field size of neurons in the convolutional neural network grows exponentially with the number of layers. In some implementations, the layers of the encoder 108 are assigned to one or more groups, and within each group, the dilation rates of layers in the group are doubled every layer, starting from a dilation rate of 1.

In particular, the encoder 108 generates an encoded source representation 110 that has the same length as the source embedding sequence 106, and thereby preserves the resolution of the source embedding sequence.

The neural machine translation system 100 includes a masked convolutional neural network decoder 112 that takes as input the encoded source representation 110 and generates as output the target embedding sequence 114, which is a representation of the target sequence 116. The target sequence 116 is a sequence of words that is a translation of the source sequence 102 into a target natural language.

Similar to the encoder 108, the decoder 112 has a dilated one-dimensional convolutional architecture, for example the masked dilated convolutional neural network decoder 112 may comprise a plurality of one-dimensional masked dilated convolutional neural network layers (in contrast, the dilated convolutional neural network encoder 108 may comprise a plurality of one-dimensional dilated convolutional neural network layers that are not masked). In general, the masked convolutional architecture of the decoder 112 ensures that the decoder does not rely on target embeddings generated at future time steps in order to generate a target embedding at a given time step. In some implementations, the layers of the decoder 112 are assigned to one or more groups, and within each group, the dilation rates of layers in the group are doubled every layer, starting from a dilation rate of 1.

The decoder 112 generates variable length target embedding sequences 114 by dynamic unfolding, where the decoder iteratively generates target embeddings based on previously generated target embeddings and the encoded source representation, for example until the decoder generates an end-of-sequence (EOS) token.

In addition to the dilated masked convolutional layers, the decoder 112 may also contain sub-batch normalization layers. That is, in these implementations, one or more of the one-dimensional masked convolutional layers of the decoder are followed by a sub-batch normalization layer. The operation of sub-batch normalization layers is described below with reference to process 400 of FIG. 4.

An example process for generating a target sequence from a source sequence using the encoder and decoder neural networks is described in more detail below with reference to FIG. 2.

Figure 2:
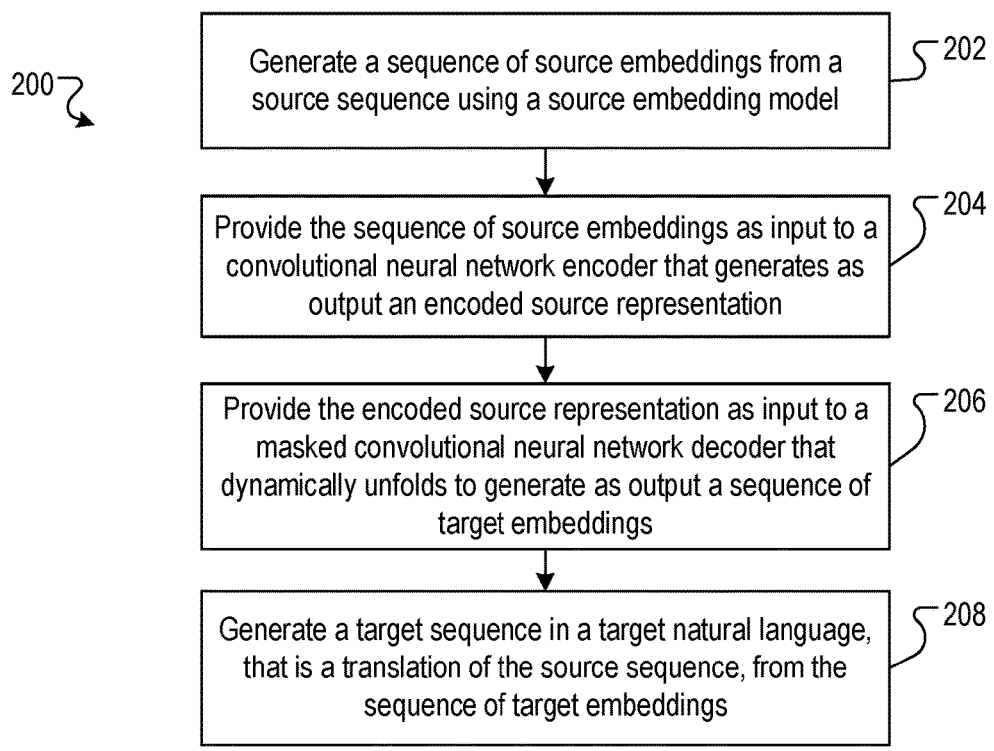
FIG. 2 is a flow diagram of an example process for generating a target sequence from a source sequence.

FIG. 2 is a flow diagram of an example process 200 for generating a target sequence from a source sequence. For convenience, the process 200 will be described as being performed by a system of one or more computers located in one or more locations. For example, a neural machine translation system, e.g., the neural machine translation system 100 of FIG. 1, appropriately programmed in accordance with this specification, can perform the process 200.

The system generates a sequence of source embeddings from a source sequence of text in a source natural language using a source embedding model (step 202). In particular, the system sequentially maps characters in the source natural language to corresponding source embedding vectors.

In some implementations, the source embedding model maps a character in the source natural language to a corresponding source embedding vector based only on the character itself. In some other implementations, the source embedding model maps words in the source sequence to corresponding source embedding vectors. In some other implementations, the source embedding model is a bag of n-grams embedding model and maps a character in the source natural language to a corresponding source embedding vector based on n-grams of characters adjacent to the given character, for n ranging from one to k, where k is a predetermined positive integer that is greater than or equal to two. For example, the source embedding model may first associate each n-gram of characters adjacent to the given character to respective n-gram embedding vectors, and generate the source embedding vector by adding the respective n-gram embedding vectors. As another example, the source embedding model may first associate each n-gram of characters adjacent to the given character to respective n-gram embedding vectors, and generate the source embedding vector by concatenating the respective n-gram embedding vectors.

Next, the system provides the sequence of source embeddings as input to a convolutional neural network encoder that generates as output an encoded source representation (step 204). In general, the encoder is configured to generate an encoded source representation with the same length as the source embedding sequence. Therefore, the encoded source representation does not have a fixed length, because the length of the encoded source representation is determined by the length of the source embedding sequence, which varies between source sequences. In general, the encoder is configured to generate an encoded source representation that is a matrix that includes a respective column of data for each source embedding in the sequence of source embeddings.

In particular, the convolutional neural network encoder includes a stack of dilated convolutional neural network layers and generates the encoded source representation by processing the sequence of source embeddings through the stack of dilated convolutional neural network layers. As described above, in some implementations, the layers of the encoder are assigned to one or more groups, and within each group, the dilation rates of layers in the group are doubled every layer, starting from a dilation rate of 1. In some implementations where the source embedding model associates each n-gram of characters adjacent to the given character in the source sequence to respective n-gram embedding vectors and generates the source embedding vector by concatenating the respective n-gram embedding vectors, the first layer of the encoder is a 1×1 convolutional layer.

Next, the system provides the encoded source representation as input to a masked convolutional neural network decoder that generates as output a sequence of target embeddings (step 206).

The decoder generates the output sequence of target embeddings using dynamic unfolding. An example process for generating the output sequence of target embeddings using dynamic unfolding is described below with reference to process 300 of FIG. 3.

Next, the system processes the sequence of target embeddings to generate a target sequence in the target natural language that is a translation of the source sequence in the source natural language (step 208). In general, the system generates the target sequence in the target natural language by sequentially mapping target embeddings to characters or words in the target natural language.

Figure 3:
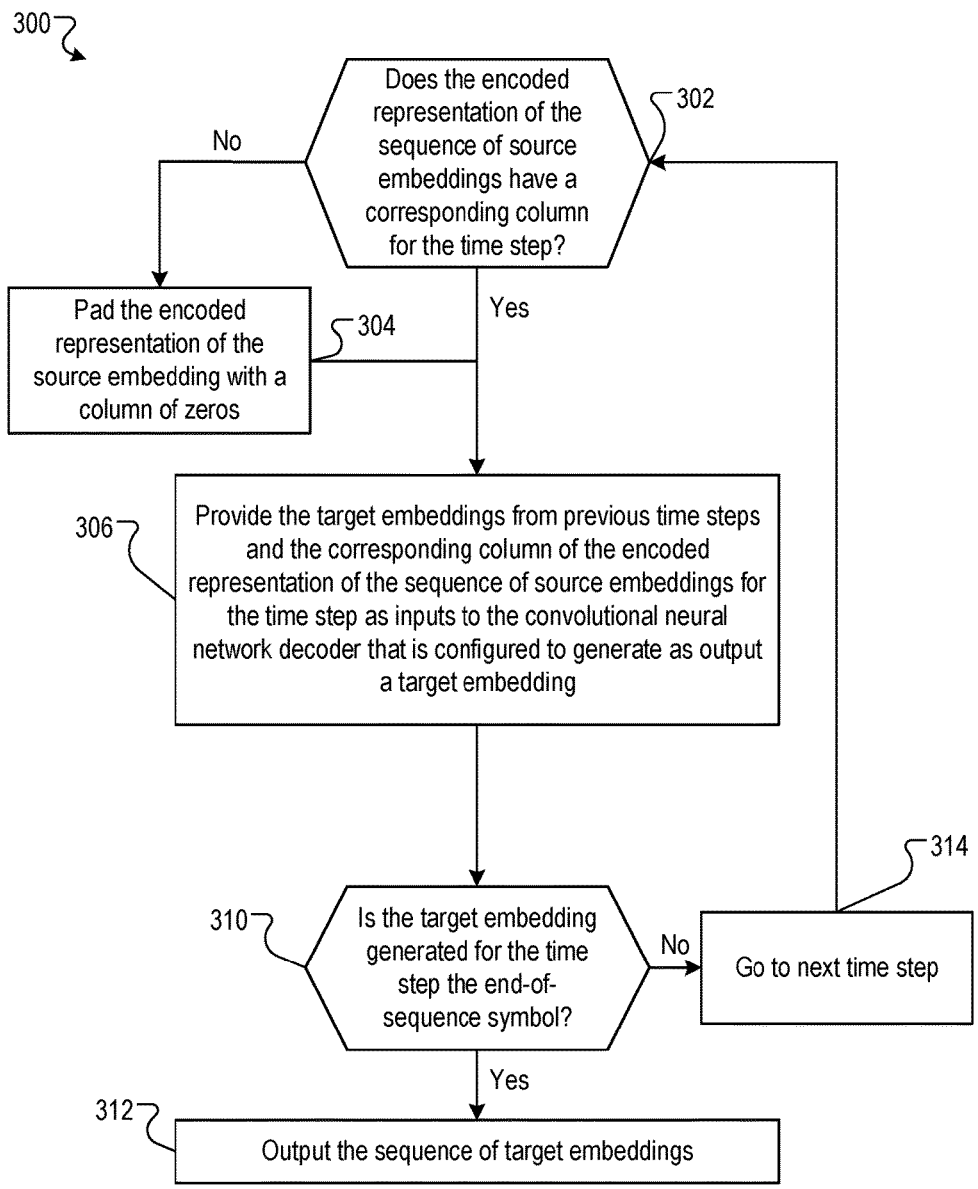
FIG. 3 is a flow diagram of an example process for generating a target sequence using a decoder network.

FIG. 3 is a flow diagram of an example process 300 for generating a target sequence using a decoder network. For convenience, the process 300 will be described as being performed by a system of one or more computers located in one or more locations. For example, a neural machine translation system, e.g., the neural machine translation system 100 of FIG. 1, appropriately programmed in accordance with this specification, can perform the process 300.

The process 300 describes an iterative process performed by the system that sequentially generates a respective target embedding at each iteration. The iterations are performed in sequence, so in the following, each iteration is referred to as a time step for convenience.

The system determines whether the encoded representation of the sequence of source embeddings has a corresponding column for the time step (step 302) (as noted, the encoded representation may be a matrix that includes a respective column of data for each source embedding in the sequence of source embeddings). In response to determining that the encoded representation does not have a corresponding column for the time step, the system identifies a column of zeros as the corresponding column of the encoded representation for the time step (step 304). The encoded representation might not have a corresponding column for the time step if, for example, the sequence of target embeddings is longer than the sequence of source embeddings. In response to determining that the encoded representation does have a corresponding column for the time step, the system refrains from modifying the encoded representation.

Next, the system concatenates the target embeddings generated at previous time steps and provides the concatenated target embeddings and the corresponding column of the encoded representation of the sequence of source embeddings for the time step as inputs to the masked one-dimensional convolutional neural network decoder for the current time step (step 306). The decoder is configured to generate as output probabilities for a set of possible target embeddings for the time step. The system samples a target embedding from set of possible target embeddings in accordance with the probabilities or selects the target embedding with the highest probability as the target embedding for the time step. For example, the final layer of the decoder maybe a softmax output layer that generates the probabilities.

In general, to ensure that the decoder does not depend on future target embeddings that have not been generated at a given time step to generate the target embedding for the given time step, the decoder implements masked convolutions. In some implementations, one-dimensional masked convolutions are implemented by zeroing out some of the weights of the convolutional kernels.

For the first time step, when no target embeddings have been generated at previous time steps, the input to the decoder is only the corresponding column of the encoded representation of the source embedding.

The system may provide the target embeddings and the corresponding column of the encoded representation as input to the decoder in any of a variety of ways. For example, the system can concatenate the target embeddings and the corresponding column of the encoded representation. As another example, the system can add the corresponding column to the target embeddings. As yet another example, the decoder can first process the target embeddings using one or more initial neural network layers, e.g., one or more 1×1 convolutional layers, and then add the column to the output of the initial neural network layers.

Next, the system determines whether the target embedding generated by the decoder is the end-of-sequence (EOS) symbol (step 310). In response to determining that the generated target embedding is the EOS symbol, the sequence of target embeddings is output (step 312). In response to determining that the generated target embedding is not the EOS symbol, the process 300 returns to step 302 and repeats the preceding steps.

The system can run the encoder and the decoder in parallel, where at each time step, the encoder generates the corresponding column of the encoded source representation, and the decoder processes the corresponding column of the source representation and the previously generated target embeddings to generate the target embedding for the time step.

The system can perform the processes 200 and 300 for source sequence inputs for which the desired output, i.e., the target sequence that translates the source sequence from a source natural language into a target natural language, is not known. The system can also perform the processes 200 and 300 on source sequence inputs in a set of training data, i.e., a set of inputs for which the target sequence that should be generated by the system is known, in order to determine trained values for the parameters of the layers of the encoder and the decoder. The processes 200 and 300 are iteratively performed on inputs selected from a set of training data as part of a conventional machine learning training technique to train the layers.

The machine learning training technique to train the layers may be stochastic gradient descent with backpropagation, where the system selects subsets of the training data, referred to as "batches", the system generates predicted target sequences corresponding to the source sequences in the batch, and the system adjusts the values of the parameters of the layers of the encoder and decoder to improve the performance of the system according to a performance measure by backpropagation.

In some implementations, one or more of the one-dimensional masked convolutional layers of the decoder are followed by a sub-batch normalization layer. The operation of sub-batch normalization layers is described with reference to process 400 of FIG. 4, to which we now turn.

Figure 4:
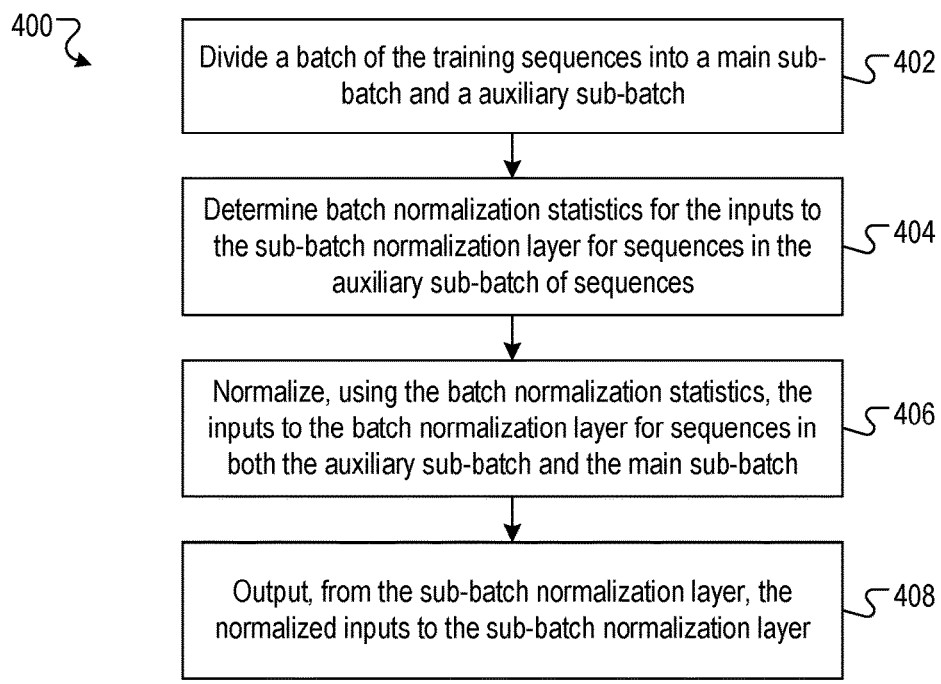
FIG. 4 is a flow diagram of an example process for sub-batch normalization.

FIG. 4 is a flow diagram of an example process 400 for sub-batch normalization. For convenience, the process 400 will be described as being performed by a system of one or more computers located in one or more locations. For example, a neural machine translation system, e.g., the neural machine translation system 100 of FIG. 1, appropriately programmed in accordance with this specification, can perform the process 400.

During a training iteration, for a given batch of source-target sequence pairs, the system divides the batch into a main sub-batch and an auxiliary sub-batch (step 402). For example, the batch may be randomly or arbitrarily divided into a main sub-batch and an auxiliary sub-batch of respective fixed sizes.

The system determines batch normalization statistics for the inputs to the sub-batch normalization layer for sequences in the auxiliary sub-batch of sequences (step 404). The batch normalization statistics may include the mean and variance of the inputs to the sub-batch normalization layer.

The system normalizes, using the batch normalization statistics for the auxiliary sub-batch, the inputs to the sub-batch normalization layer for sequences in both the auxiliary sub-batch and the main sub-batch (step 406).

The system outputs, from the sub-batch normalization layer, the normalized inputs to the sub-batch normalization layer (step 408), i.e., as input to another layer in the decoder, e.g., a dilated masked convolutional layer.

During training of the system with sub-batch normalization, backpropagation is performed at each iteration based only on the predicted target sequences for the main sub-batch, while the predicted target sequences for the auxiliary sub-batch are ignored in performing backpropagation.

Sub-batch normalization layers differ from conventional batch normalization layers, which do not divide the batch into a main sub-batch and an auxiliary sub-batch, but rather determine the batch normalization statistics based on the whole batch. The calculation of batch normalization statistics takes into account inputs to the batch normalization layer along all the target embeddings in the target embedding sequence, and therefore normalizing the inputs to the batch normalization layer with the batch normalization statistics violates the conditioning structure of the decoder. Using sub-batch normalization layers however, batch normalization statistics are computed based on the auxiliary sub-batch and not the main sub-batch, so the conditioning structure of the decoder is preserved for sequences in the main sub-batch, and backpropagation is performed based on the predicted sequences for the main sub-batch and not the auxiliary sub-batch.

In some implementations, one or more of the layers of the convolutional neural network encoder and/or decoder are wrapped in a residual block that contains one or more additional convolutional layers. In general, residual blocks enable more effective training of neural networks by adding the input to the residual block to the output of the residual block, allowing the layers inside the residual block to learn incremental representations. In some implementations, the residual block includes a rectified linear unit (ReLU) activation layer. In other implementations, the residual block includes a multiplicative unit activation layer.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MxNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A neural machine translation system implemented by one or more computers, the neural machine translation system comprising:
   a convolutional encoder neural network configured to:
      receive an input sequence of source embeddings representing a source sequence of words in a source natural language; and
      process the input sequence of source embeddings to generate an encoded representation of the source sequence; and
   a masked convolutional decoder neural network configured to:
      receive the encoded representation of the source sequence generated by the convolutional encoder neural network; and
      process the encoded representation of the source sequence to generate an output sequence of target embeddings representing a target sequence of words that is a translation of the source sequence into a target natural language.

2. The neural machine translation system of claim 1, wherein the decoder neural network is configured to generate the output sequence using dynamic unfolding.

3. The neural machine translation system of claim 2, wherein the encoded representation is a matrix that includes a respective column of data for each source embedding, and wherein, at each time step in the output sequence, the decoder neural network is configured to take as input the corresponding column of the encoded representation and to generate a target embedding.

4. The neural machine translation system of claim 3, wherein, for each time step that does not have a corresponding column in the encoded representation, the system is configured to add a new column to the encoded representation that corresponds to the time step and set values in the column to zero.

5. The neural machine translation system of claim 3, wherein at each time step, the decoder neural network is conditioned on the encoded representation and the target embeddings at time steps before the time step.

6. The neural machine translation system of claim 1, wherein the encoder neural network is configured to preserve a resolution of representations of the source embeddings throughout the encoder neural network.

7. The neural machine translation system of claim 1, wherein the decoder neural network comprises a plurality of one-dimensional masked dilated convolutional neural network layers.

8. The neural machine translation of claim 7, wherein a particular one-dimensional masked dilated convolutional neural network layer is followed by a sub-batch normalization layer, wherein the sub-batch normalization layer is configured to, during training of the neural machine translation system on a batch of training sequences:

determine batch normalization statistics of outputs generated by the particular one-dimensional masked dilated convolutional neural network layer for training sequences in an auxiliary sub-batch of the batch of training sequences; and normalize, using the batch normalization statistics, outputs generated by the particular one-dimensional masked dilated convolutional neural network layer for training sequences in a main sub-batch of the batch of training sequences that is different from the auxiliary sub-batch.

9. The neural machine translation system of claim 7, wherein one or more of the one-dimensional masked dilated convolutional neural network layers are wrapped in a residual block that contains one or more additional convolutional layers.

10. The neural machine translation system of claim 9, wherein the residual block includes a rectified linear unit (ReLU) activation layer.

11. The neural machine translation system of claim 9, wherein the residual block includes a multiplicative unit activation layer.

12. The neural machine translation system of claim 7, wherein the plurality of one-dimensional masked dilated convolutional neural network layers are grouped into a plurality of groups, and wherein, within each group, the dilation rates of one-dimensional masked dilated convolutional neural network layers in the group are doubled every layer.

13. The neural machine translation system of claim 1, wherein each source embedding is a respective bag of n-grams embedding, and wherein, for a given character in the source sequence, the bag of n-grams embedding for the character is a combination of n-gram embeddings of adjacent characters to the given character in the source sequence.

14. The neural machine translation system of claim 13, wherein the bag of n-grams embedding of the given character is a sum of the n-gram embeddings of adjacent n-grams to the given character for n ranging from one to k, wherein k is a predetermined positive integer that is greater than or equal to two.

15. The neural machine translation system of claim 13, further comprising:
an input subsystem configured to:
receive the source sequence; and
generate a sequence of bag of n-grams embeddings from the source sequence.

16. The neural machine translation system of claim 1, wherein the encoder neural network comprises a plurality of one-dimensional dilated convolutional neural network layers that are not masked.

17. A non-transitory computer readable storage medium storing instructions executable by a data processing apparatus and that upon such execution causes the data processing apparatus to perform operations comprising:
obtaining an input sequence of source embeddings representing a source sequence of words in a source natural language; and
processing the input sequence to generate an output sequence of target embeddings representing a target sequence of words that is a translation of the source sequence into a target natural language, the processing comprising:
processing the input sequence of source embeddings using a convolutional encoder neural network to generate an encoded representation of the source sequence; and
processing the encoded representation of the source sequence using a masked convolutional decoder neural network to generate the output sequence of target embeddings.

18. The non-transitory medium of claim 17, wherein the decoder neural network is configured to generate the output sequence using dynamic unfolding.

19. A method comprising:
obtaining an input sequence of source embeddings representing a source sequence of words in a source natural language;
processing the input sequence to generate an output sequence of target embeddings representing a target sequence of words that is a translation of the source sequence into a target natural language, the processing comprising:
processing the input sequence of source embeddings using a convolutional encoder neural network to generate an encoded representation of the source sequence; and
processing the encoded representation of the source sequence using a masked convolutional decoder neural network to generate the output sequence of target embeddings.

20. The method of claim 19, wherein the decoder neural network is configured to generate the output sequence using dynamic unfolding.

* * * * *